United States Patent

[11] 3,581,481

[72] Inventors Rudolph A. Hanson;
Edward J. Ziegler; John E. Fischer, all of Jackson, Mich.
[21] Appl. No. 827,676
[22] Filed May 26, 1969
Division of Ser. No. 552,012, May 23, 1966, Pat. No. 3,466,855.
[45] Patented June 1, 1971
[73] Assignee Yard-Man, Incorporated
Jackson, Mich.

[54] ROTARY MOWER BLADE BRAKE
3 Claims, 3 Drawing Figs.
[52] U.S. Cl. .................................................... 56/11.3, 74/240, 188/80, 188/83
[51] Int. Cl. .................................................... A01d 35/26
[50] Field of Search .................................................... 56/25.4, 255; 188/80, 83, 218; 74/240, 241, 242.8, 242.15

[56] References Cited
UNITED STATES PATENTS

| | | | |
|---|---|---|---|
| 339,697 | 4/1886 | Roncaglia | 74/242.8X |
| 993,684 | 5/1911 | Vom Hoff | 74/240 |
| 1,515,725 | 11/1924 | Brink et al. | 188/83 |
| 1,518,379 | 12/1924 | Barber | 188/83 |
| 2,168,572 | 8/1939 | Landis | 74/240X |
| 2,346,756 | 4/1944 | Hoppe | 188/83 |
| 2,750,805 | 6/1956 | Winkel | 74/240 |
| 2,833,102 | 5/1958 | Roof | 56/25.4 |
| 2,862,569 | 12/1958 | Strunk | 74/240X |
| 2,865,159 | 12/1958 | Musgrave | 56/25.4 |
| 3,169,358 | 2/1965 | Ertsgaard et al. | 56/25.4 |

Primary Examiner—Russell R. Kinsey
Attorney—Beaman & Beaman

ABSTRACT: A braking mechanism for use with rotary lawn mowers utilizing a vertically disposed blade shaft having a lower end upon which is attached a mower blade, and having an upper end mounting a belt-driven pulley wherein clutching of the blade shaft is achieved by tightening and loosening the drive belt. The blade brake consists of mechanism mounted upon the mower blade housing structure maintaining engagement of the belt and the blade shaft pulley when the belt is released wherein rotational "coasting" of the blade is minimized due to the slackened belt being "dragged" and driven by its engagement with the blade shaft pulley.

PATENTED JUN 1 1971  3,581,481
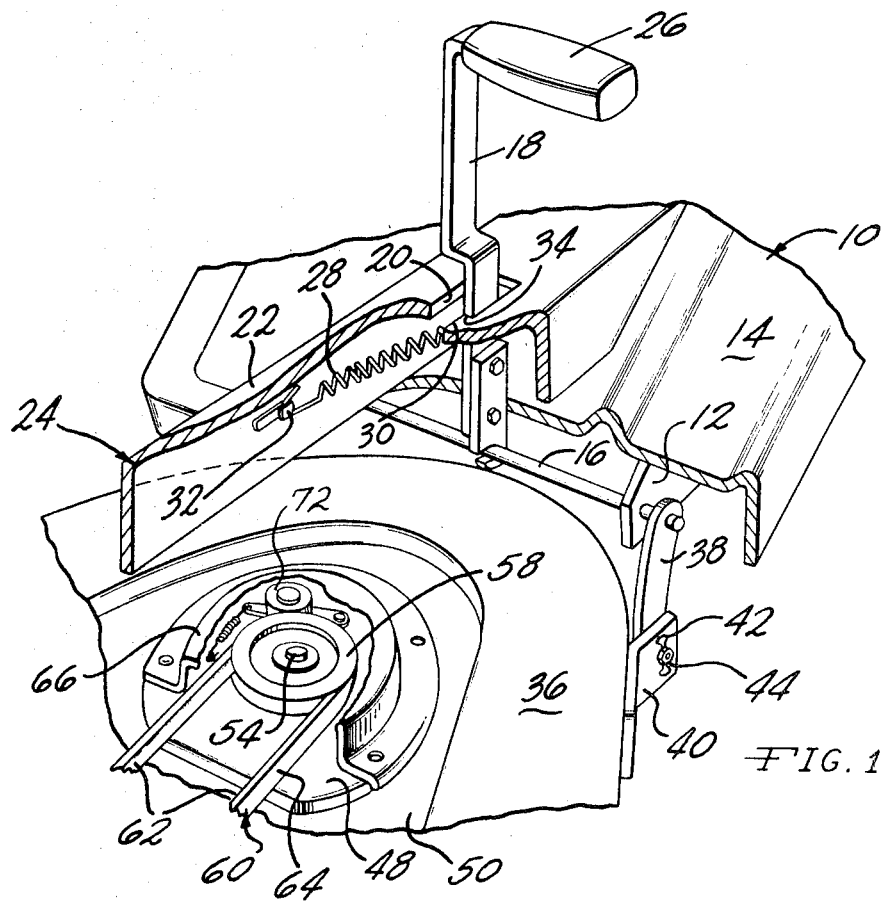
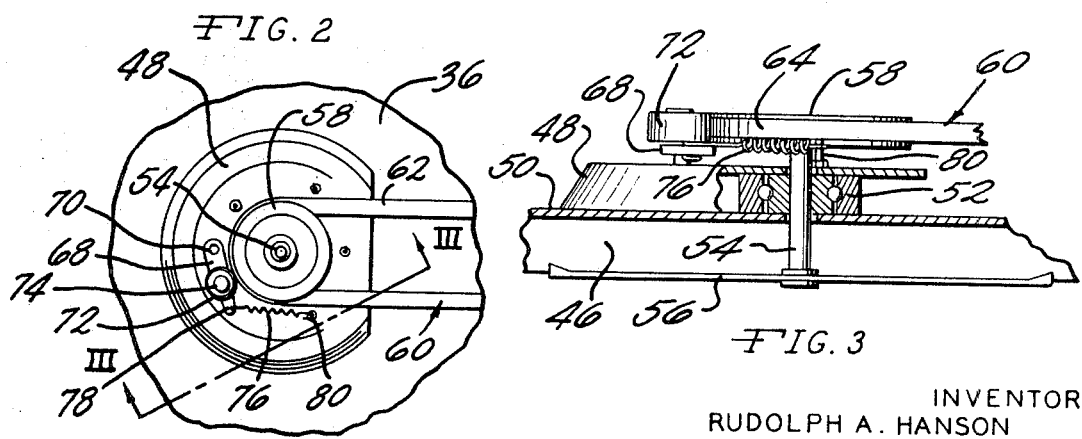
INVENTORS
RUDOLPH A. HANSON
EDWARD J. ZIEGLER
JOHN E. FISCHER
BY
Beaman & Beaman
ATTORNEYS

ROTARY MOWER BLADE BRAKE

CROSS-REFERENCES TO RELATED APPLICATIONS

This application is a division of U.S. application Ser. No. 552,012, filed May 23, 1966, now U.S. Pat. No. 3,466,855.

BACKGROUND OF THE INVENTION

The invention pertains to rotary lawn mower structure, and is particularly concerned with the braking of the blade after being declutched from the driving engine wherein the rotation of the blade will quickly terminate when it is desired to declutch the blade from the engine.

While many rotary lawn mowers of the walking type directly mount the blade structure upon the lower end of the engine crankshaft, larger mowers, particularly those of the riding type, usually use a belt drive to connect the blade shaft to the engine driving the blade. Many types of rotary lawn mower devices, such as lawn tractors, are on the market utilizing this type of blade drive because of its simplicity and ability to permit the mower to raise and lower as it traverses the ground, and the engine which propels the mower, as well as drives the blade, may be mounted either in front of, or in back of, the blade with respect to the direction of mower movement.

For safety reasons, and also for reasons of use of the mower other than mowing, for instance, for use as a tractor, or for conveying the mower from one location to another prior to mowing, it is desirable to be able to declutch the mower blade from the engine, even though the engine may be in a driving relationship with drive wheels of the mower apparatus. With a belt-driven blade arrangement, the most common means for clutching and declutching the mower blade to its engine is by means of a belt-tightening system which tightens and loosens the belt interposed between the engine and the blade shaft pulley to clutch and declutch the blade, respectively. This variation in the tension of the belt may be accomplished by means of an idler pulley, or by changing the distance between the axes of the engine drive shaft and the blade shaft, such as by shifting the entire blade housing toward and away from the engine.

In a belt-tightener type of clutching system, as soon as the belt tension is released, the blade will tend to rotate and "coast" due to inertial forces. In that such a "coasting" action may exist for a considerable period of time, and the blade will be rotating very rapidly during the initial declutching stage, the declutching of the blade under such circumstances does not render the mower "safe" even though the blade is not under power. The desire to quickly terminate the rotational movement of the blade once it is declutched from the engine is universal, and safety requirements state that the blade must stop within a predetermined time, and various types of brake devices are in use. In view of the highly competitive lawn mower market it is necessary that such brakes be of an economical construction, yet dependable in operation, require little or no maintenance and not impose a drag upon the blade when it is being driven by the mower engine. Brake devices presently available do not meet these requisites to the extent desired, and such devices usually consist of brake shoes or other frictional apparatus which causes a wear upon the moving parts, require maintenance and are susceptible to malfunctioning due to foreign matter lodging between the movable components.

SUMMARY OF THE INVENTION

It is a purpose of the invention to provide a rotary mower blade brake which is capable of braking and retarding rotation of a rotary mower blade after the blade has been declutched from its drive engine. In particular, the brake is utilized with a blade drive system employing a belt-tightening clutching arrangement, and the brake utilizes the slackened, declutched blade drive belt to produce the braking of the blade.

One of the features of the invention is the simplicity of the brake structure, resulting in a low manufacturing cost, and assembly and maintenance problems are virtually eliminated. Additionally, the brake of the invention aids in maintaining the belt upon the mower blade drive shaft pulley when the belt is slackened or declutched, and yet the brake mechanism does not impose objectionable frictional forces upon the blade drive system when the blade is clutched and is in driving connection to the engine.

In the practice of the invention, the blade structure includes a housing in which the vertically disposed blade shaft is rotatably mounted, the housing and blade shaft are moved toward and away from the drive engine such that the movement of the blade housing changes the distance between the axes of the blade shaft and the drive pulley, such as the engine power-takeoff pulley. When the blade structure is moved away from the engine drive pulley the belt connected between the blade shaft pulley and engine pulley is tightened to clutch the blade shaft into driving engagement with the engine. When the blade structure is moved toward the engine the blade pulley belt is slackened declutching the blade. The brake mechanism of the invention includes a roller mounted upon the blade-housing structure adjacent the blade shaft pulley which engages the "back" of the belt in a biasing manner to maintain engagement of the belt with the blade pulley under all conditions regardless of the tension within the belt. A spring is used to achieve the biasing of the roller into engagement with the belt.

Due to the belt-engaging roller, a frictional relationship between the belt and blade pulley will exist at all times regardless of the tension in the belt and thus when the blade is declutched from the engine and the belt tension is released, the inertia forces causing rotation of the blade will likewise drive the belt. In that the belt will often be engaging guide structure due to its untensioned state, and because of the weight of the belt and the "drag" it imposes upon the blade pulley which resists the inertial rotational forces of the blade and blade shaft, the blade rotation is quickly terminated.

When the belt is tensioned to establish driving of the mower blade, the engagement of the roller with the belt imposes no adverse frictional or braking forces upon the blade drive system and the blade is driven in a normal manner. Thus, the blade brake of the invention automatically applies a braking action to the mower blade as soon as the drive belt tension is released, yet does not adversely affect the rotation of the blade during operation.

The size and configuration of the blade brake is quite small as to permit installation within conventional blade pulley housings and shrouds and does not add objectionable weight to the blade structure.

BRIEF DESCRIPTION OF THE DRAWING

The aforementioned objects of the invention will be appreciated from the following description and accompanying drawings wherein:

FIG. 1 is a detail, perspective view, partially sectioned, illustrating the mower blade housing structure utilizing the brake mechanism of the invention, FIG. 2 is a top plan detail view of the mower structure utilizing the invention, the pulley cover being removed for purpose of illustration, and FIG. 3 is an elevational, sectional, detail view taken along III-III of FIG. 2.

DESCRIPTION OF THE PREFERRED EMBODIMENT

In the drawings those basic construction features of a mower which may practice the invention are illustrated. The illustrated mower construction is that shown in the mower described in U.S. Pat. No. 3,466,855, of which the present application is a division.

In the described mower structure only the front region 10 of a mower utilizing the invention is shown. The front region 10 will be supported upon ground wheels, not shown, and may be of a cast or sheet metal construction. A pair of brackets 12, one of which is shown, depend from the underside of the front region portion 14 to provide support for a shaft 16 pivotally mounted upon the brackets 12.

A handle 18 is affixed to the shaft 16 and extends through a slot 20 defined in the base portion 22 of an inverted channel member 24 affixed to the mower front end region, and extending toward and connecting to the rear of the mower. The handle 18 terminates in a hand grip 26 and is biased rearwardly, or in a counterclockwise direction, FIG. 1, by means of a spring 28 having one end attached to a hole in the handle, not shown, and the other end is attached to an anchor 32 defined upon one of the legs of the channel member 24. The slot 20 is formed with an offset or bayonet portion defining a shoulder 34 with respect to the slot edge 30 against which the rear edge of the handle 18 may bear to maintain the mower blade in the rear or declutched condition. In FIG. 1 the handle is illustrated in the declutched position and is in engagement with the slot shoulder 34. Upon moving the handle 18 to the left, to clear the shoulder 34, the spring 28 will bias the handle in a counterclockwise direction causing pivoting of the shaft 16 to move the blade structure forwardly, as will be described.

The mower blade structure includes a sheet metal housing 36 in which the mower blade is rotatably mounted and housed. The housing 36 is affixed to the shaft 16 by means of a pair of lever arms 38 connected to the shaft and attached to the blade housing brackets 40. In FIG. 1 only one of the lever arms 38 is shown. The brackets 40 include a plurality of holes 42 for selectively receiving a pivot bolt 44 for adjusting the height of the front end of the blade housing, and a nut maintains the pivot bolt 44 of the arms in the desired hole to provide the desired blade vertical adjustment. The rear portion of the mower housing 36 may be mounted upon ground wheels, or otherwise freely supported to permit movement of the housing back and forth in the longitudinal direction of the mower as determined by the position of the handle 18. Thus, when the handle is in its maximum forward position as shown in FIG. 1, the housing 36 will be in its maximum rearward position. When the handle is removed from engagement with the shoulder 34, and is in its "rearward" position the housing will be biased towards its forward position by the spring 28.

The blade housing structure, in addition to the sheet metal blade shroud 46, includes a bearing housing 48 affixed to the upper deck 50 of the housing. The deck 50 is disposed horizontally, and supports an antifriction bearing 52, FIG. 3, which rotatably supports the blade shaft 54 in a vertical manner. The blade shaft 54 has a mower blade 56 removably affixed to its lower end in the usual manner and the upper end of the blade shaft 54 extends through the bearing housing 48 and has a V-belt pulley 58 affixed thereto.

A drive belt for the blade structure is illustrated at 60, and this belt is preferably of the V-type having tapered side surfaces 62, and a relatively flat back surface 64. The belt surfaces 62 engage the tapered surfaces of the pulley 58 in the well-known manner. A pulley shroud or cover 66 is disposed over the bearing housing 48 and the pulley 58, and is open at the rear to permit the belt 60 to extend to the engine power-takeoff pulley, not shown, located at the rear portion of the mower.

The mower blade brake structure includes a small lever 68 pivotally mounted upon the bearing housing 48 by a pivot bolt 70 whereby the lever may pivot relative to the blade shaft 54 in a horizontal plane. The lever 68 supports a roller 72 mounted upon a vertical shaft 74 which extends upwardly from the lever. The roller 72 is preferably mounted upon antifriction bearing means whereby it may be rotated with little friction. An extension spring 76 has one end attached to a hole 78 in the free end of the lever 68, and the other end thereof is anchored to the bearing housing by an anchor pin 80 as shown in FIGS. 2 and 3.

It will be appreciated from FIG. 3 that the roller 72 is vertically aligned with the pulley 58 and the belt 60 wherein the roller will engage the belt back surface 64. The lever 68 and roller 72 are so located that the force exerted upon the belt by the roller is in a substantial radial direction and presses the belt surfaces 62 into firm engagement with the blade pulley 58. The spring 76 insures that engagement between the roller 72 and the belt 70 will occur at all times regardless of the tension in the belt.

When the drive belt 60 is tensioned to establish a driving connection between the engine and the blade, the roller will be engaging the belt in the manner shown in the drawings. Upon the handle 18 being moved forwardly to the position shown in FIG. 1 the housing 36 moves toward the engine and power-takeoff pulley to slacken belt 60 and thereby declutch the blade shaft 54 from the engine. However, as the roller 72 will maintain that portion of the belt directly interposed between the roller and the pulley 58 in engagement with the pulley a frictional relationship always exists between the belt and pulley even though the tension in the belt has been released. Although the belt is no longer being rotated by the engine it will be moved by the pulley due to the inertial forces tending to rotate the blade after it has been declutched from the engine, but the energy required to move the belt when disengaged from the engine power-takeoff pulley is sufficient to quickly dissipate the kinetic energy resulting from the inertia of the rotating blade and the blade will cease rotation within several seconds. Thus, the engagement of the roller 72 with the belt surface 64 to maintain a frictional connection between the belt and the pulley at all times serves to effectively "brake" the blade against rotation upon its being disconnected from the engine.

When the handle 18 is moved rearwardly to tension the belt 60 the blade pulley 58 will again be rotated by the engine power-takeoff pulley and the blade will be driven for operational purposes. In that the roller 72 is mounted upon antifriction bearings, and as the tension in the belt will maintain the belt firmly within the pulley, the "riding" of the roller upon the belt surface 64 while the blade is in operation produces only insignificant frictional forces upon the belt, and thus the brake structure does not adversely affect the operation of the blade when under power.

In addition to quickly stopping the declutched blade, the presence of the roller 72 also prevents the pulley 58 and belt 60 from becoming misaligned when the drive belt is not under tension, as occasionally occurs with belt-tightener types of clutch devices. The roller will assure that the belt stays within the groove of the pulley so that when the blade is to be clutched the proper alignment will be present between the pulley and belt.

It is appreciated that modifications to the inventive concept may be apparent to those skilled in the art without departing from the spirit and scope of the invention, and it is intended that the invention be defined only by the following claims:

We claim:

1. In a rotary lawn mower including a blade-housing support adapted to be traversed across the terrain to be mowed, a blade housing mounted upon said support, a vertically disposed shaft rotatably mounted on said blade housing, said shaft having an upper end and a lower end, a blade pulley mounted upon said shaft upper end, a blade mounted on said lower end, a drive belt mounted on said pulley adapted to be driven by power means upon being tensioned, means selectively tightening and loosening said belt to selectively drive said pulley and shaft, and belt-engaging means mounted upon said blade housing engaging said belt and maintaining said belt in frictional drivable engagement with said blade pulley when the tension within said belt is loosened whereby the engagement of said belt and blade pulley causes said pulley to drive said belt when the belt is loosened and the blade is rotating which brakes said shaft against rotation.

2. In a rotary lawn mower as in claim 1, wherein said belt-engaging means includes a lever pivotally mounted on said blade housing, a belt-contacting member mounted upon said lever spaced from the pivot axis thereof and directly engaging said belt, said belt being interposed between said blade pulley and said belt contacting member, and a spring biasing said lever in a direction which biases said contacting member toward said shaft and maintains engagement of said belt and blade pulley regardless of the tension within said belt.

3. In a rotary lawn mower as in claim 2, wherein said belt-contacting member comprises a roller freely rotatably mounted on said lever having an axis of rotation substantially parallel to said shaft.